(No Model.)
C. HERZOG.
MEASURING VESSEL.
No. 495,037. Patented Apr. 11, 1893.
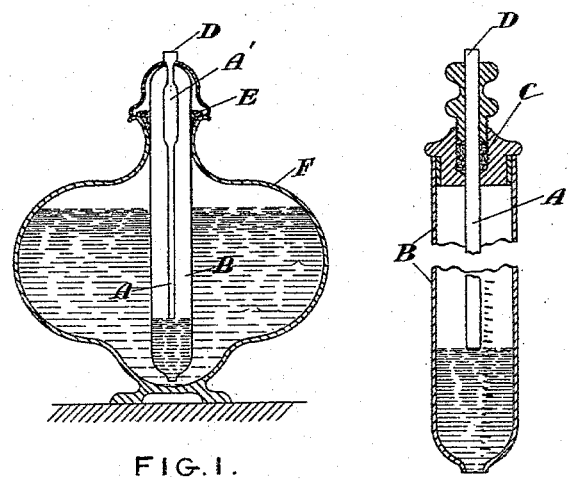
FIG.1.
FIG.2.
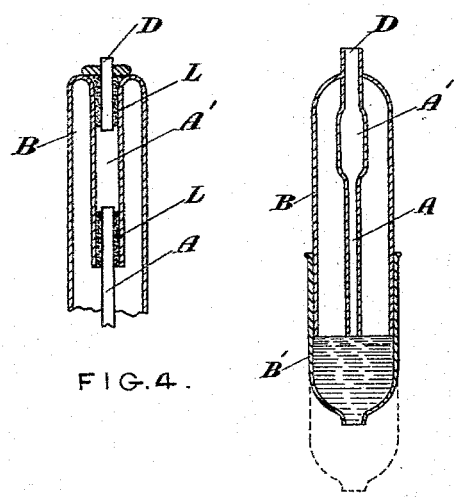
FIG.4.
FIG.3.
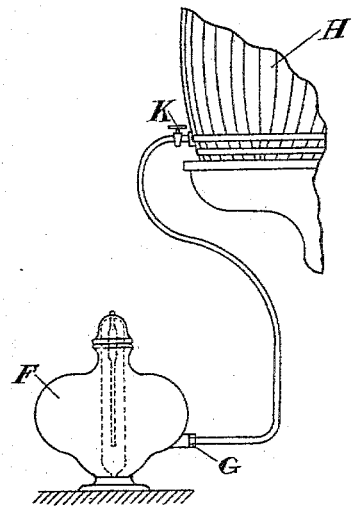
FIG.5.
Witnesses:
E. K. Sturtevant.
E. B. Bolton
Inventor:
Conrad Herzog
by A. Renard
atty.

UNITED STATES PATENT OFFICE.

CONRAD HERZOG, OF LONDON, ENGLAND.

MEASURING-VESSEL.

SPECIFICATION forming part of Letters Patent No. 495,037, dated April 11, 1893.

Application filed October 28, 1892. Serial No. 450,199. (No model.) Patented in England March 22, 1892, No. 2,082.

*To all whom it may concern:*

Be it known that I, CONRAD HERZOG, a subject of the Emperor of Germany, residing at London, England, have invented an Improved Liquid-Measuring Appliance, (which has been patented to me in Great Britain under No. 2,082, sealed as of February 4, 1891, but actually sealed on March 22, 1892,) of which the following is a specification.

My invention relates to an appliance for accurately measuring volumes of liquids withdrawn from a supply vessel or reservoir, which volumes may be definite in a single appliance, or adjustable to a desired variation of bulk in a single appliance.

My invention consists essentially of a dipping tube provided with an orifice at either end, and provided with an internal tube of smaller diameter passing through the orifice at the top, and adjustable in position therein for variable volumes, or fixed rigidly therein; the function of the said smaller tube being to determine the volume of liquid received or retained by the dipping vessel.

To carry my invention into effect I may employ diverse modifications of the said dipping and regulating tubes, of which the following are examples.

Figure 1 is a section of a vessel filled with spirits or liquid and the dipping measure resting therein closing the mouth of the vessel as a cork. Fig. 2 is a section of a dipping or measuring tube, provided with a gland and adjustable regulating tube. Fig. 3 is a section of a dipping or measuring tube, with a telescopic adjustable outer tube. Fig. 4 shows a modified method of construction of the outer and inner air regulating tube. Fig. 5 is a convenient arrangement of reservoir vessel attached to a supply cask or vessel.

Where the regulating small tube A is passed through the upper orifice of the dipping tube B and is adjustable, I provide a liquid tight stuffing box or joint C, in the upper orifice, and the inner regulating tube A is pressed down to any desired point within the dipping tube according to a scale externally marked upon the outer tube shown in Fig. 2, and by moving the tube A, so that its lower end will be opposite a higher or lower mark on the scale the proper measure of the liquid to be withdrawn from the vessel by the dipping tube will be determined.

The action is as follows:—When the dipping tube is passed into the liquid, the liquid rises, driving out the air through the regulating tube A, until the liquid seals the bottom of this tube. Should the liquid rise higher than this point, it will only compress, the inclosed volume of air above it, which by its elasticity will force back the liquid to the bottom of the regulating tube, as the dipping tube is raised from the liquid. When the dipping tube is raised from the liquid, the finger of the operator is used to close the upper orifice D of the tube A, to prevent the flow of the measured liquid from the dipping tube, until the finger is removed. Instead of the regulating inner tube A being adjustable in the stuffing box or joint C the said tube may be rigid with the outer tube as in Fig. 1 or the lower part of the dipping tube B may equivalently be telescoped as at B and B' Fig. 3 and adjustable as to length. As a small variable excess of liquid may exist in the regulating tube A, this is kept of small diameter to minimize this quantity, and the upper part of the regulating tube may be enlarged into a chamber A' to prevent splashing of the liquid upward when the dipping tube is inserted into the liquid hastily.

A cheap and convenient manner of making the inner tube with an expanded chamber is shown in Fig. 4, where the shell of the glass dipping tube is worked inward into a tube mouth. Both ends of this tube mouth are closed with an india-rubber packing L, through which are inserted the lower small tube A and the upper part D of the same tube. If desired I may use stoppers tightly and rigidly fitting the mouth of the supply vessels, through which one or more dipping tubes of different capacities may be inserted as easy sliding fits through suitable orifices. If desired also the approximate depth to which the dipping tube may be inserted into the supply vessel may be checked by an adjustable flange E Fig. 1 or by a ring of vulcanite or other suitable material upon the outside of the dipping tube, coming down on the said stopper, which will also serve to exclude air when at rest.

My appliance may be conveniently constructed of glass or other suitable cleanly, and fluid resisting, material.

It may be convenient to construct the reservoir vessel F Fig. 4 with a nipple or union G, to which a pipe may be attached communicating with a supply cask H and controlled by a tap K, from which cask the supply of liquid to the reservoir vessel F, may be maintained from time to time as required.

Having now described my invention, what I desire to secure by Letters Patent is—

1. In combination, an external tube with an open orifice at its lower end, and an internal air regulating tube, adapted to fit into the upper orifice of the external tube, and to be closed by the finger of the operator, to form a dipping and discharge apparatus for the measurement and removal of a definite quantity of liquid from a receptacle to a drinking vessel, substantially as and for the purpose described.

2. In combination, in a liquid measuring and discharge apparatus, an external tube with an open orifice at its lower end, a stuffing box at its upper end, adapted to receive a sliding adjustable internal air-regulating tube, closed by the finger of the operator, when removing a definite measured quantity of liquid from a receptacle to a drinking vessel substantially as described.

3. In combination, in a liquid measuring and discharge apparatus, an external tube, made in two parts telescoping on one another, and having an open orifice at its lower end, with an internal air regulating tube adapted to fit into the upper orifice of the external tube and to be closed by the finger of the operator, substantially as and for the purposes described.

4. In combination, in a liquid measuring and discharge apparatus, an external tube with an open orifice at its lower end, and an internal air regulating tube of small diameter in its lower part, and with an enlarged chamber at its upper part, and adapted to fit into the upper orifice of the external tube substantially as and for the purpose described.

5. In a liquid measuring and discharge apparatus, a dipping or measuring tube with an open orifice at its lower end, and an inwardly projecting tube mouth at its upper end, provided with two pieces of packing, one at either end, holding the upper and lower parts of an internal air-regulating tube, and forming an enlarged chamber between the said parts, substantially as described.

In testimony whereof I have signed my name to this specification in the presence of two subscribing witnesses.

CONRAD HERZOG.

Witnesses:
RICHARD A. HOFFMANN,
CHARLES H. CARTER.